United States Patent Office 3,236,824
Patented Feb. 22, 1966

3,236,824
PROCESS FOR PREPARING ATACTIC AND ELASTOMERIC POLYOLEFINS AND CATALYST SYSTEMS THEREFOR
Richard M. Wilhjelm, Chagrin Falls, Ohio, assignor to The Standard Oil Company, Cleveland, Ohio, a corporation of Ohio
No Drawing. Filed Apr. 6, 1962, Ser. No. 185,529
4 Claims. (Cl. 260—88.2)

This invention relates to a process for the polymerization of olefins, and to improved noncrystalline polyolefins obtainable in accordance therewith, and to catalyst systems of the Ziegler type promoted by a halophenol capable of polymerizing olefins with the production of noncrystalline or elastomeric polyolefins at a high reaction rate.

The Ziegler catalysts, various mixtures of organoaluminum hydrocarbon compounds and transition metal halides, are now widely used in the polymerization of olefins. Ziegler British Patent No. 799,823 decribes a variety of such systems, composed of aluminum hydrides, aluminum alkyls and aluminum aryls, with or without halogen and oxyether groups, employed in combination with halides of metals of Groups IV to VI, subgroup (b), of the Periodic Table, preferably titanium. These catalysts have enabled the production of isotactic, atactic or less crystalline, and syndioactic polyolefins.

The reaction mechanism by which these catalysts function to control the structure of the growing polymer chain is still obscure. The objective has usually been to produce a highly isotactic polymer, and it is thought that the high proportion of isotactic material usually obtained is due to the stereospecificity of the carbon-metal bond in the propagation step.

The Ziegler catalysts are particularly effective for polymerizing ethylene at quite high reaction rates. The higher olefins are polymerized more slowly. Hence, if mixtures of ethylene and higher olefins are used, such as mixtures of ethylene and propylene in equal molar amounts, the resulting polymer will contain proportionately larger blocks of polyethylene units, so that it is necessary, in order to introduce a large proportion of propylene or other higher olefin into the polymer, to use a feed containing a very high proportion of such olefin, in the case of propylene, ranging from 50 to 90 mol percent, in order to prepare a copolymer containing from 40 to 66% propylene. This results, of course, in a slower rate of polymer production, because of the high proportion of propylene. Furthermore, Ziegler catalysts produce both isotactic and amorphous polymer, the former in major proportions. However, no satisfactory way is known to reduce the proportion of isotactic polymer, where the less crystalline or amorphous polymer is the desired product.

The less crystalline or amorphous polymers are desirable where an elastomeric or rubbery material is desired. Typical of this type of polymer are copolymers of ethylene and propylene containing from 25 to 75 mol percent of each monomer. These copolymers have recently attracted considerable interest, because they are essentially saturated, and are available from cheap and plentiful monomers. Their oxidation resistance, i.e., air-aging properties, and ozone resistance are excellent, in this respect resembling butyl rubber. They are superior to butyl rubber in dynamic mechanical properties and in air permeability, more closely resembling styrene-butadiene rubbers in this respect, and they are intermediate between styrene-butadiene rubbers and natural rubbers in low temperature properties.

Natta and co-workers carried out considerable development work on the preparation of ethylene-propylene copolymers, using Ziegler catalysts, and have published a series of articles on them, La Chimica e l'Industria 39, 743; 825 (1957), and 40, 717; 896 (1958). However, the chief manufacturing problems in these systems, as has been indicated, are the efficient incorporation of a sufficient amount of propylene, and the exclusion of crystalline propylene blocks and crystalline ethylene blocks in the final copolymer. Homogeneity of the copolymer is also a problem, particularly with regard to polyethylene content.

In accordance with the instant invention, catalyst systems of the Ziegler type are improved with respect to the reaction rate and polymer content of the product by incorporating therewith a halophenol. The halophenol has the effect of suppressing crystalline or isotactic polymer formation, at the same time maintaining a very high rate of polymerization not only of the ethylene but also of higher olefins, such as propylene, the latter more than the former, so that the rate of polymerization of the higher is more nearly the same as or higher than that of the ethylene. The result is that in a mixed copolymerization of, for example, ethylene and propylene, the two olefins can be reacted either at more nearly the same rate, or, in certain instances, the higher at a greater rate, according to the molar proportions of each, so that the final product will contain the desired proportion of each olefin, in a more nearly heterogeneous or random copolymer and containing only little, if any, linear polyethylene or long blocks of polyethylene. The result is a copolymer having excellent elastomeric properties, a very low crystalline content, if any, and high heat resistance. Furthermore, the elastomeric polymers of the invention are sufficiently similar to the known olefin copolymers that they can be vulcanized in accordance with conventional procedures. As is frequently the case with such copolymers, relatively small quantities of a third component, such as limonene or similar diene, may be incorporated in the olefin feed during the copolymerization so as to introduce a nominal amount of unsaturation in the final polymer in order to improve the vulcanization response.

The halophenol promoters of the invention can be described by the following formula:

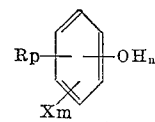

In the above formula, X represents halogen, such as fluorine, chlorine, bromine or iodine, and R represents hydrogen or an organic hydrocarbon radical having from one to about twelve carbon atoms, $n$, $m$ and $p$, respectively, represent the number of hydroxy, halogen and R groups on the aromatic ring. $n$ is at least 1, $m$ is at least 1, and $p$ equals the number of available positions on the ring minus $(n+m)$. When the aromatic ring has six positions, $p = 6 - n + m$. However, it will be understood that R can represent an additional aromatic or cycloaliphatic ring condensed with the benzene nucleus shown, in which event the available positions may be greater than six. In the case of naphthalene, for example, there are eight possible positions, so that $p$ in this case will be $8 - n + m$.

Typical R organic hydrocarbon radicals include, for example, alkyl groups, such as methyl, ethyl, n-propyl, iso-propyl, n-butyl, iso-butyl, secondary-butyl, tertiary-butyl, n-amyl, iso-amyl, iso-hexyl, iso-octyl, n-nonyl, tertiary-nonyl, n-decyl, n-dodecyl; aryl radicals such as phenyl and naphthyl; cycloalkyl radicals such as cyclopentyl, cyclohexyl and cycloheptyl; aralkyl and alkaryl radicals such as benzyl, α-phenethyl, β-phenethyl, tolyl and xylyl; and saturated and unsaturated or aromatic alkylene groups condensed with the benzene nucleus, such as in the case of naphthalene, tetrahydronaphthalene and anthracene.

Preferably, the OH hydroxyl and X halide groups are para to each other. If there is more than one halogen and/or hydroxyl group, the additional groups in excess of one can be in any position of the ring or rings, but preferably one pair of each is para. The position of the R groups is immaterial.

As such halophenols, there can, for example, be employed p-chlorophenol, p-iodophenol, p-chlororesorcinol, p-chloro-m-cresol, p-chloro-o-cresol, m-chlorohydroquinone, 3,5-dichloro-m-cresol, 3,5-dichloro-phenol, 2,4,6-trichlorophenol, 4,6-dichloro-m-resorcinol, 4-chloro-α-naphthol, 4 - iodo - α - naphthol, 5 - chloro - β - naphthol, 4-chloro-pyrogallol, 4,6-dichloro-pyrogallol, 4-bromo-pyrocatechol, 4,5-dichloro-pyrocatechol, 4-iodo-5-methyl-pyrocatechol, 4,5,6 - trichloropyrogallol, 1,2,3,4 - tetrahydroxy-5-chlorobenzene, 1,2,4,5-tetrahydroxy-3-bromobenzene, 1,2,3,4,5-pentahydroxy-6-chlorobenzene, and 2,4,5-trichlorophenol.

These promoters can be employed in conjunction with any catalyst systems of the Ziegler type. These catalyst systems are now widely known to those skilled in the art as Ziegler catalysts and Ziegler-Natta catalysts, and are described in numerous publications. Ziegler, for example, lists a variety of catalytic aluminum compounds in British Patent No. 799,823, within the genus $R_mAlX_n$, where R represents hydrogen or a hydrocarbon radical, and X represents hydrogen, halogen, an alkyloxy group, an aryloxy group, the residue of a secondary amine, a mono-N-substituted amide, mercaptan, thiophenol, carboxylic acid, or sulfonic acid, $m$ is 1 or 2, and the sum of $(m+n)$ is 3.

The following are exemplary:

| | |
|---|---|
| Aluminum hydride | $AlH_3$. |
| Alkyl- or aryl-aluminum dihydrides | $RAlH_2$. |
| Dialkyl- or diaryl-aluminum hydrides | $R_2AlH$. |
| Alkyl- or aryl-aluminum dihalides | $RAl(Halogen)_2$. |
| Dialkyl- or diaryl-aluminum monohalides | $R_2Al$ Halogen. |
| Alkyl- or aryl-aluminum dialkoxy or diaroxy compounds | $RAl(OR)_2$. |
| Dialkyl- or diaryl-aluminum alkoxy or aroxy compounds | $R_2Al(OR)$. |

R in the above formula represents an aliphatic or aromatic hydrocarbon radical and "Halogen" represents fluorine, chlorine, bromine or iodine.

In addition to these aluminum compounds, there have been used organo-aluminum hydrocarbon compounds of the general structure $R_3Al$, where R represents an organic hydrocarbon radical having from 1 to 12 carbon atoms. Such compounds include the trialkyl, triaryl, triaralkyl, trialkaryl and tricycloalkyl aluminums. The use of such compounds with and without other aluminum compounds as described by Ziegler is disclosed in British Patent No. 826,184, U.S. Patent No. 2,893,328 to Reed et al., patented August 4, 1959.

Typical organoaluminum hydrocarbons include triethyl aluminum, tri-n-propyl aluminum, triisobutyl aluminum, triisopropyl aluminum, triisoamyl aluminum, diethyl isopropyl aluminum, trinonyl aluminum, triisohexyl aluminum, tri-(secondary decyl) aluminum, tridodecyl aluminum, triphenyl aluminum, tribenzyl aluminum, tri-β-phenethyl aluminum, tricyclohexyl aluminum, diethyl phenyl aluminum, diphenyl isooctyl aluminum, trixylyl aluminum, tritolyl aluminum, and ethyl dibenzyl aluminum.

In Ziegler or Ziegler-Natta catalyst systems, these aluminum compounds are employed in conjunction with compounds of the metals of sub-groups (b) of Groups IV to VI of the Periodic Table, including titanium, zirconium, hafnium, thorium, uranium, vanadium, niobium, tantalum, chromium, molybdenum and tungsten. These compounds are preferably employed in the form of the halide, oxyhalide or complex halide, but freshly precipitated oxides or hydroxides or organic compounds, such as the alkoxides, acetates, benzoates and acetyl acetonate, can also be used.

Preferably, the transition metal compound is a halide of titanium or vanadium.

Typical compounds in this class are titanium trichloride, titanium tribromide, vanadium trichloride, vanadium tetrachloride, zirconium tetrachloride, molybdenum dichloride, molybdenum trichloride, molybdenum pentachloride, vanadium tribromide, titanium triiodide, zirconium tetrabromide, chromous iodide, chromous chloride, chromic chloride, chromic bromide, molybdenum pentabromide, molybdenum oxychloride, molybdenum oxybromide, molybdenum tetrachloride, vanadium dichloride, vanadyl tribromide, vanadyl dichloride, vanadyl trichloride, vanadyl dibromide, tantalum bromide, tantalum chloride, hafnium bromide, hafnium chloride, zirconium oxybromide, zirconium oxychloride, and zirconium oxyiodide.

The proportions of Ziegler catalyst and halophenol promoter in the catalyst system are important to obtain the desired catalytic effect. The amount of metal compound and aluminum compound should be such that the aluminum-to-transition metal ratio is within the range from 1:1 to 4:1. The overall aluminum-to-transition metal-to-halophenol molar ratio should be from between 1:1:0.5 to 4:1:6, preferably approximately 4:1:3.

The catalyst composition is readily prepared by dispersing the Ziegler components and the halophenol at room temperature in an inert solvent, preferably one in which all of the components are soluble. The catalyst should be mixed and kept under an inert atmosphere because of the instability of the Ziegler components in air, and it frequently is desirable to heat the combination in order to develop the catalytic properties. The heating temperature is not critical, and can range from 35 to 150° C. It is usually desirable to dissolve the aluminum compound in the solvent, add the halophenol, and then add the transition metal compound.

The solvent serves not only as a medium for formation of the catalyst coordination complex, but also as a medium for the olefin polymerization reaction. Even if only a portion of the final catalyst is in solution, the polymerization can proceed.

Hydrocarbon solvents are preferred solvents because of the greater ease of separation from the reaction product, and because they are also good solvents for olefins. The solvent should be substantially anhydrous. Hydrocarbons such as heptane, hexane, isooctane, tetrahydronaphthalene, decahydronaphthalene, Stoddard solvent, cyclohexane, decane, petroleum naphthas, purified diesel oil, petroleum ethers, kerosene, and similar inert oxygen-, sulfur- and nitrogen-free hydrocarbons or mixtures thereof can be used. Chlorinated solvents such as ethylene dichloride, tetrachloroethane, and chlorobenzene can also be used to prepare elastomeric copolymers during the course of this invention.

The catalyst composition is ready for use as soon as prepared in the polymerization of olefins, without further purification or treatment. The polymerization can be carried out in the same reaction vessel as is employed for forming the catalyst, in which event the vessel is equipped with means for introducing olefin gas or liquid under an inert atmosphere, and with means for heating and cooling the contents, heating to start the reaction, if necessary, and cooling to control the reaction once it has begun, inasmuch as the polymerization reaction is exothermic. The vessel should also be equipped with means for stirring the contents to ensure thorough mixing.

The catalyst composition can be stored if required, but it is preferable to store it under an inert atmosphere, so as to prevent the deleterious action of air. More concentrated solutions are better stored than dilute ones. When the polymerization is to be carried out, an appropriate amount of catalyst concentrate is diluted with inert solvent and then used for the polymerization.

The catalyst systems of the invention can be employed for the polymerization of any olefin or mixture thereof. Preferred olefins are α-olefins, and especially ethylene, propylene, and mixtures of the two in any proportion or with relatively nominal amounts of a diolefin such as limonene or similar diene. The catalysts can accordingly be employed for the polymerization of any olefins corresponding to the formula:

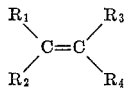

$R_1$, $R_2$, $R_3$ and $R_4$ in the above formula represent hydrogen or organic hydrocarbon radicals having from one to about twelve carbon atoms. Preferably, $R_1$ and $R_2$, or $R_3$ and $R_4$, are both hydrogen. $R_1$, $R_2$, $R_3$ and $R_4$, can, for example, be one or more alkyl groups, such as methyl, ethyl, n-propyl, iso-propyl, n-butyl, iso-butyl, secondary butyl, tertiary-butyl, n-amyl, iso-amyl, iso-hexyl, iso-octyl, n-nonyl, tertiary-nonyl, n-decyl, and n-dodecyl; aryl radicals such as phenyl and naphthyl; cyloalkyl radicals such as cyclopentyl, cyclohexyl and cycloheptyl; aralkyl and alkaryl radicals such as benxyl, α-phenethyl, β-phenethyl, tolyl and xylyl; and saturated and unsaturated or aromatic alkylene groups condensed with the benzene nucleus, such as in the case of naphthalene, tetrahydronaphthalene and anthracene.

Exemplary olefins are ethylene, propylene, butene-1, butene-2, 2-methyl butene-1, pentene-1, pentene-2, octene-1, heptene-1, hexene-1, decene-1, dodecene-1, 2-ethyl hexene-1, styrene, butadiene, isoprene, 1,3-pentadiene, limonene, 1,4-pentadiene, and highly unsaturated petroleum fractions and polymers thereof, such as motor polymer.

The invention is especially advantageous in the production of noncrystalline or slightly crystalline elastomeric polyolefins. These are best obtained from mixtures of olefins containing two or more different olefin species, such as mixtures of ethylene and propylene, mixtures of ethylene and styrene, mixtures of propylene and styrene, mixtures of propylene and butadiene, mixtures of ethylene, propylene and butadiene, mixtures of ethylene, propylene and styrene, mixtures of ethylene, propylene and isoprene, mixtures of ethylene, propylene, styrene and butadiene, mixtures of ethylene, propylene and isobutylene, mixtures of ethylene, propylene and chloroprene, mixtures of ethylene, propylene and 1,3-pentadiene, and mixtures of ethylene, propylene and limonene.

The proportions of the olefins in such mixtures determine the elastomeric properties of the polymer. Noncrystalline or slightly crystalline, rubbery, elastomeric products are obtained from olefin mixtures containing from 10 to 90 mol percent of each component. Beyond these proportions, crystallinity increases markedly. The optimum rubbery, elastomeric properties usually are demonstrated by polymers containing from 40 to 60 mol percent of each component. The preferred ratio is about 1:1. However, even polymers obtained from only α-olefin (other than ethylene) can be highly atactic, and usually contain less than 20 to 50% isotactic or crystalline material, as determined by solubility in boiling n-heptane or isooctane. The isotactic or crystalline material can be separated from such mixtures, in order to obtain homogeneous atactic and isotactic polymer fractions with uniform properties.

In all cases, the amorphous character of the polymer in the case of the halophenol modified catalyst is greater than in its absence, under identical reaction conditions.

Furthermore, very high rates of polymerization are obtained.

The polymerization reaction can be conducted at temperatures ranging from 25 to about 150° C., preferably from 50 to 120° C. The higher the temperature, up to about 120° C., the higher the reaction rate, and thus the greater the yield per unit of time. However, at temperatures above 120° C., the catalyst may decompose at too high a rate. Optimum yields therefore are obtainable at temperatures below 120° C., at which temperatures excessive catalyst decomposition does not occur.

Pressures of from 14 to 1000 p.s.i.g. can be used. In the case of ethylene-propylene mixtures, the preferred polymerization pressures range from 50 to 200 p.s.i.g., and the preferred polymerization temperatures are in the range from 70 to 120° C. At temperatures below 70° C., a good quality copolymer of ethylene and propylene is obtainable, but this polymer is of a rather high average molecular weight, and therefore its flow and processability characteristics may not be satisfactory for general, all-around use. Products produced at temperatures above 120° C. tend to be less desirable in physical properties than those produced at lower temperatures.

The reaction can be carried out as a batch, semi-continuous or continuous process. In a typical batch procedure, all of the reactants are added initially, the reactor is closed and the reaction maintained at temperature and pressure, if necessary adding more olefin to maintain pressure, until the desired product is obtained. In a semi-continuous process, olefin and/or catalyst can be admitted to the reaction vessel from time to time, and the reaction product separated therefrom, to maintain a given pressure of olefin and active catalyst concentration throughout the reaction. This ensures a constant proportion of available olefin for the polymerization, and has an effect upon the properties of the product. In a continuous process, the reactants are continuously admitted to the reaction zone and the desired reaction product is from time to time or continuously separated from the reaction mixture. This can be accomplished by cycling the reaction mixture from the reaction zone to a recovery zone where the solid polymer is removed, and the liquids and gases returned to the reaction zone for further reaction.

A semi-continuous or continuous process is desirable because the entire polymerization reaction can then be maintained at constant temperature, pressure and reactant concentration, thus ensuring uniformity of the product both in chemical structure and in molecular weight. It is also possible under these conditions to control catalyst concentration and diluent concentration within close limits. As a further control of molecular weight, hydrogen gas can be introduced to serve as a chain stopper, preventing the formation of excessively high molecular weight molecules. The Al:Ti ratio is important in obtaining optimum results with hydrogen, and is adjusted by trial and error to ascertain the optimum enhancement in properties for a given polymer, using a stepped series of Al:Ti ratios. Other molecular weight modifiers are known to the art and can be used.

The reaction, if carried out as a continuous process over a long period of time, may show a gradual decline in reaction rate. This is particularly true with vanadium-containing catalysts as contrasted to titanium-containing catalysts. This, if it occurs, is usually due to exhaustion of the catalyst due to loss of catalyst in removal of the reaction mixture, and is easily remedied by adding additional catalyst, for example, in suitable increments together with the olefin feed. The amount of additional catalyst added is sufficient to maintain the desired rate of polymer formation.

At the termination of the polymerization, olefin addition is discontinued, the temperature is lowered, and an aliphatic alcohol or acetone is added to the polymer-catalyst mixture. In the case of a continuous reaction, reaction mixture withdrawn from the reaction vessel is diluted with alcohol or acetone after cooling. The resulting mix is then heated to decompose and extract out the catalyst ingredients. This simple treatment is usually sufficient to remove the catalyst and precipitate the polymer, which can be removed and recovered essentially free of catalyst contamination by further washing with alcohol or acetone. With many of the vanadium-containing catalysts, the spent catalyst may frequently by extracted out by means of very thorough contact with suitable aqueous media, followed by washing with water, and then vacuum stripping off of the organic solvent from the dissolved or highly swollen viscous polymer media. The recovered polymer can be dried using conventional techniques.

Any isotactic polymer which may be present can be separated by extracting the crude material with a boiling hydrocarbon or chlorinated hydrocarbon solvent. However, in the case of polymers obtained from vanadium-containing catalysts and mixtures of olefins having a content of each component within the range from 20 to 80 mol percent, substantially the entire product is amorphous, and no extractive separation is required. X-ray diffraction can be employed to verify the crystallinity of the product, in order to determine whether extractive separation is necessary, since the atactic material is amorphous, or noncrystalline.

The rate of polymer production in this reaction is quite high, even at low temperatures and pressures. The reaction rate can be increased in all cases by increasing the temperature or pressure, or both.

The following examples, in the opinion of the inventor, represent the best embodiments of the invention.

In these examples, the relative crystallinity of the polymer was determined by X-ray diffraction. The ratio of ethylene and propylene in the final copolymer was determined by infrared absorption. Measurements were made at 8.7 microns to determine the polypropylene skeletal vibration, and at 13.9 microns to determine the polyethylene. The logarithm of the ratio of the two absorbances is a linear function of the propylene content of the copolymer (Analytical Chemistry 33, 215 (1961)).

Molecular weight (approximate) measurements were made by the standard viscosity dilution method (Chiang, Journal of Polymer Science 28, 235 (1958)).

Example I

A 1-liter Parr bomb containing 400 ml. of isooctane was sealed and flushed with nitrogen. To this was added 58 ml. of a 10% solution of triethyl aluminum in cyclohexane and 4.3 ml. of p-chlorophenol and the resulting mixture was stirred for 30 minutes at room temperature. Next, 1 ml. of titanium tetrachloride was added. The mol ratio of aluminum:titanium:p-chlorophenol was then 4:1:4. The amount of triethyl aluminum was sufficient to reduce the titanium tetrachloride to titanium trichloride in situ.

Approximately 5 cubic feet of propylene was liquefied and then added to the bomb. The temperature was raised to 82° C. Within 2 or 3 minutes, an exothermic reaction set in which caused the temperature to reach 120° C. very quickly. The reaction was continued for 4 hours at a temperature of 120° C. The average pressure maintained during the reaction was 650 p.s.i.

A total of 150 grams of pure, white, solid polypropylene was collected after extraction of catalyst, using acetone. This corresponded to 219 grams of polymer per gram of titanium, or 54 grams of polymer per gram of titanium per hour. The molecular weight of the product was 158,000. This product was extracted with boiling isooctane, and was found to be 75.6% noncrystalline polymer.

Example II

A 50 ml. glass flask was flushed with nitrogen. 27.5 ml. of a 10% solution of triethyl aluminum, 2.1 ml. of p-chlorophenol, and 5 ml. of (1 molar) titanium tetrachloride were added, in that order. The mol ratio of aluminum:titanium:p-chlorophenol was 4:1:4.2. The glass flask was placed in a 150 mesh stainless steel wire basket, which was in turn placed in a 1-liter Parr bomb which had been flushed with nitrogen and which contained 300 ml. of cyclohexane. The glass flask was broken and the bomb quickly sealed. The temperature was raised to 82° C. while propylene was admitted to a pressure of 150 p.s.i. The reaction was continued at 82° C. and 150 p.s.i. for 4 hours.

32 grams of polymer were obtained, corresponding to 134 grams of polymer per gram of titanium, produced at a rate of 34 grams of polymer per gram of titanium per hour. The molecular weight of the polymer was 122,000, 55% noncrystalline, as determined by extraction of boiling isooctane. The polymer was relatively free of catalyst contamination.

Example III 400 ml. of cyclohexane was added to a 2-liter, 3-necked flask which was then flushed with nitrogen. 55 ml. of a 10% solution of triethyl aluminum in cyclohexane and 4.3 ml. of p-chlorophenol were added to the flask, and the mixture was then stirred for 30 minutes at room temperature. Propylene was added, together with 10 ml. of (1 molar) titanium tetrachloride. The mol ratio of aluminum:titanium:p-chlorophenol was 4:1:4. Propylene addition was continued and the reaction conducted for 4½ hours at atmospheric pressure and 82° C.

17.6 grams of solid polymer was obtained corresponding to 37 grams of polymer per gram of titanium, produced at a rate of 8.2 grams of polymer per gram of titanium per hour. Its molecular weight was 98,000. 48.6% of the polymer was noncrystalline, as determined by extraction in boiling n-hexane.

The above experiment was repeated, omitting the p-chlorophenol. The molar ratio of aluminum to titanium was 4:1. The reaction was carried out at 75° C., and propylene admitted for 2 hours at atmospheric pressure. Only a trace of solid polymer was produced, showing the effect of the p-chlorophenol in increasing both rate of polymerization of propylene and yield.

Example IV 400 ml. of cyclohexane was added to a 2-liter, 3-necked flask which was then flushed with nitrogen. 55 ml. of a 10% solution of triethyl aluminum in cyclohexane and 4.2 ml. of p-chlorophenol were added, and the mixture then was stirred at room temperature for 20 minutes. Next, 8 grams of vanadium oxychloride were added. The mol ratio of aluminum:vanadium:p-chlorophenol was 0.87:1:0.87. Propylene was admitted and the temperature raised to 82° C. Reaction was continued, continuing the addition of propylene, for 6 hours at 82° C. and atmospheric pressure.

A yield of 28.1 grams of solid polymer was collected. This corresponded to 12.1 grams of polymer per gram of vanadium, produced at a rate of 2 grams of polymer per gram of vanadium per hour. The approximate molecular weight of the crude polymer was 105,000, 56.3% noncrystalline. The isotactic fraction had a molecular weight of 206,000.

Example V 300 ml. of cyclohexane and 7 ml. of vanadium oxychloride were placed in a 1-liter Parr bomb, which was sealed and flushed with nitrogen. 55 ml. of a 10% solution of triethyl aluminum in cyclohexane and 5 ml. of p-chlorophenol were added. The mol ratio of aluminum:vanadium:p-chlorophenol was 4:1:5. Propylene was admitted and the temperature brought to 82° C. at a pressure of 400 p.s.i. Reaction was continued at this temperature for 3 hours.

31.1 grams of solid polymer was collected, corresponding to 54 grams of polymer per gram of vanadium, produced at a rate of 18 grams of polymer per gram of vanadium per hour. The product was 75% noncrystalline.

*Example VI*

400 ml. of cyclohexane was added to a 2-liter, 3-necked flask which was flushed with nitrogen. 55 ml. of a 10% solution of triethyl aluminum in cyclohexane and 2.15 ml. of p-chlorophenol were added to the flask, which was then stirred for 30 minutes at room temperature. The mol ratio of aluminum:titanium:p-chlorophenol was 4:1:2. Propylene was then admitted, together with 10 ml. of 1 molar titanium tetrachloride, and the temperature raised to 82° C. and the reaction continued at atmospheric pressure for 7 hours, while continuously admitting propylene.

20 grams of polymer was obtained, corresponding to 42 grams of polymer per gram of titanium, produced at a rate of 6 grams of polymer per gram of titanium per hour. The molecular weight of the crude polymer was 113,000. 68.5% of the polymer was noncrystalline. The isotactic fraction had a molecular weight of 273,000.

*Example VII*

A 1-liter Parr bomb containing 400 ml. of cyclohexane was flushed with nitrogen and then sealed. 4.4 grams of triethyl aluminum in the form of a 10% solution in cyclohexane and 2.5 grams of p-chlorophenol were added by syringe through a serum cap in the inlet line. 1.9 grams of titanium tetrachloride was then added, giving a mol ratio aluminum:titanium:p-chlorophenol of 4:1:2, and the mixture was stirred at room temperature for 30 minutes. The temperature of the mixture was raised to 80° C., and propylene was admitted to a pressure of 150 p.s.i. The reaction was continued for 4 hours at this temperature and pressure.

174 grams of polypropylene was collected, corresponding to 364 grams of polymer per gram of titanium, produced at a rate of 91 grams per gram of titanium per hour. The molecular weight of the crude polymer was 142,000. 60.8% of the polymer was noncrystalline. The isotactic fraction had a molecular weight of 420,000.

*Example VIII*

50 ml. of cyclohexane was placed in a 250 ml., 3-necked flask equipped with a stirrer, condenser, syringe cap and inlet tubes. The flask was then flushed with nitrogen. 10 ml. of a 1.32 molar solution of triethyl aluminum in cyclohexane and 0.8 ml. of p-chlorophenol were admitted by the syringe technique, and the mixture stirred for 5 minutes at room temperature. Next, 1.2 grams of titanium tetrachloride was added. The molar ratio aluminum:titanium:p-chlorophenol was 3:1:1. The flask was then heated at 100 to 105° C. for one hour, to ensure reduction of the titanium tetrachloride to titanium trichloride. The reaction mixture was cooled to room temperature, and an additional 5 ml. of the triethyl aluminum solution added. Propylene was admitted for two hours at 30° C.

7.7 grams of white polypropylene was collected, corresponding to 25 grams of polymer per gram of titanium, produced at a rate of 12.5 grams of polymer per gram of titanium per hour. The molecular weight of the crude polymer was 466,000. The isotactic fraction constituted 67%, and had a molecular weight of 575,000.

*Example IX*

Into a 2-liter, 3-necked flask equipped with reflux condenser, stirrer, serum cap and inlets for nitrogen, ethylene and propylene, was introduced 600 ml. of cyclohexane. The flask was then flushed with nitrogen, and 4.58 grams of triethyl aluminum dissolved in cyclohexane, and 4.05 grams of p-chlorophenol were added by springe through the serum cap. The mixture was stirred for 30 minutes at 50° C., and 1.9 grams of titanium tetrachloride then added. The molar ratio aluminum:titanium:p-chlorophenol was 4:1:3. Then the temperature was brought to 70° C., and ethylene and propylene admitted simultaneously at equal rates through flow meters at such rate that 300 ml. of each gas was admitted per minute. At this rate, all of the gas was absorbed in the reaction mixture as it was added. The reaction was continued for 4½ hours at 70° C. at atmospheric pressure.

At the conclusion of the reaction, 68 grams of ethylene-propylene copolymer was recovered, equivalent to 142 grams of copolymer per gram of titanium, at a production rate of 31.5 grams of copolymer per gram of titanium per hour. The polymer was a noncrystalline, sticky rubber, containing only a trace of crystalline material, as determined by X-ray diffraction. Infrared absorption analysis indicated that the polymer contained 2 parts of ethylene for each part of propylene.

*Example X*

Into a 2-liter, 3-necked flask, equipped as in Example IX, was placed 600 ml. of cyclohexane, to which, after nitrogen flushing, were added 5.2 grams of triethyl aluminum and 5.4 grams of p-chlorophenol and 2.19 grams of titanium tetrachloride. The aluminum:titanium:p-chlorophenol mol ratio was 4.4:1:3.8. Ethylene and propylene were admitted to the reaction mixture in the mole ratio of 1:6.3, while the temperature was brought to 50° C. Ethylene and propylene were continued to be admitted at atmospheric pressure during the reaction, which was continued for 6 hours at this temperature.

A total of 15 grams of ethylene-propylene copolymer was collected, corresponding to 27 grams of copolymer per gram of titanium, or 4.5 grams of copolymer per gram of titanium per hour. The average molecular weight of the copolymer was approximately 79,000. Infrared absorption analysis showed that the ethylene-propylene ratio in the copolymer was 1:15, indicating that the propylene reacted at a faster rate than the ethylene, since its ratio in the polymer was twice its ratio in the mixture of gases admitted. Only a trace of crystallinity was detected by X-ray diffraction.

*Example XI*

Into a 2-liter, 3-necked flask, equipped as in Example IX, was placed 600 ml. of cyclohexane, to which were added 5 grams of triethyl aluminum, 5.5 grams of p-chlorophenol and 1.9 grams of titanium tetrachloride. The mol ratio aluminum:titanium:p-chlorophenol was 4.4:1:4.3. Ethylene and propylene were admitted in the ratio of 1:4, the temperature brought to 50° C. and reaction continued at this temperature and atmospheric pressure for 5 hours, while the ethylene-proylene mixture was continuously admitted at a rate such that all of the gas was absorbed in the reaction mixture.

A total of 23 grams of copolymer was recovered, equivalent to 48 grams of copolymer per gram of titanium per hour. The copolymer was a noncrystalline, sticky rubber having no crystallinity detectable by X-ray diffraction. The molecular weight of the crude copolymer was approximately 172,000 and the ethylene-propylene ratio in the copolymer was 1:14, a considerably higher proportion than the proportion of propylene in the feed, showing that the propylene reacted at a reaction rate more than 3 times that of the ethylene.

*Example XII*

A 1-liter Parr bomb containing 400 ml. of cyclohexane was sealed and flushed with nitrogen. 3.54 grams of triethyl aluminum dissolved in cyclohexane and 4.05 grams of p-chlorophenol were added by syringe through a serum cap in the inlet line. The mixture was then stirred at room temperature for 30 minutes. 1.64 grams of vanadium oxychloride were added. The mol ratio of aluminum:vanadium:p-chlorophenol was 3:1:3. The temperature was raised to 80° C., and 200 ml. of liquid propylene added, together with gaseous ethylene under pressure. The reaction began, and the temperature rose rapidly to 120° C. Reaction was continued for 4 hours at an average temperature of 90° C. and an average pressure of 600 p.s.i.

142 grams of copolymer was obtained, corresponding to 286 grams of copolymer per gram of vanadium, at a production rate of 74 grams of copolymer per gram of vanadium per hour. The molecular weight was approximately 579,000. The copolymer was noncrystalline, no crystallinity being detected by X-ray diffraction, and the ethylene-propylene ratio was determined by infrared absorption to be 2:1.

*Example XIII*

Into the bomb used in Example XII was placed 400 ml. of cyclohexane, and 3.66 grams of triethyl aluminum dissolved in cyclohexane and 4.7 grams of p-chlorophenol added. 1.9 grams of titanium tetrachloride were then added, giving an aluminum:titanium:p-chlorophenol ratio of 4:1:2.1. The mixture was stirred at room temperature for 30 minutes before addition of the titanium tetrachloride. Then 150 ml. of liquefied propylene was added, together with gaseous ethylene to a pressure of 650 p.s.i. The addition of ethylene was terminated after 5 minutes, but the polymerization reaction was allowed to continue for 3½ hours, at an average pressure of 600 p.s.i and an average temperature of 80° C.

Approximately 150 grams of a very sticky, rubbery copolymer was obtained, corresponding to 313 grams of copolymer per gram of titanium produced at a rate of 89 grams of copoylmer per gram of titanium per hour. The copolymer contained no crystallinity detectable by X-ray diffraction. The molecular weight of the copolymer was approximately 81,000, and the ethylene:propylene ratio 1.5:2.

The polyolefins produced in accordance with the invention can be employed in the same manner as conventional polyolefins produced from the same monomers, such as polyethylene, polypropylene and polyisobutylene. While the invention is useful in the production of both noncrystalline and isotactic polyolefins, its greatest utility is in the production of polyolefins having a high amorphous or noncrystalline content, with little or no isotactic material, particularly in the production of copolymers of a plurality of olefins, nearly all of which are noncrystalline. The noncrystalline materials are elastomeric, amorphous polymers and copolymers having excellent hysteresis properties.

The elastomeric materials, since they are saturated hydrocarbon polymers, do not contain chemical functionality, and cannot be cross-linked with conventional rubber vulcanizing agents. However, they can be vulcanized by the use of the vulcanizing agents ordinarily employed with ethylene-propylene copolymers. Such vulcanizing agents have been described by Natta and co-workers, and the systems which can be used including carbon black, sulfur, peroxide systems, such as mixtures of sulfur and dicumyl peroxide, and mixtures of polysulfides such as diheptyl disulfide with peroxides such as ditertiary butyl peroxide and dicumyl peroxide. Gamma irradiation also can be used in some cases. Various metallic oxides such as zinc oxide, silica, titanium dioxide, vanadium pentoxide, alumina, ferric oxide and antimony trioxide can also be employed. Relatively small quantities of a third component such as limonene or other diolefin can be incorporated with the principal ethylenepropylene components of the olefin feed during the copolymerization so as to introduce a nominal amount of unsaturation in the final polymer in order to increase vulcanization response.

I claim:
1. The process for the polymerization of an olefin selected from the group consisting of propylene and ethylenepropylene mixtures which comprises heating the olefin at a temperature and for a time to effect polymerization in the presence of a catalyst produced by (1) mixing (a) a trihydrocarbon aluminum compound with (b) a halophenol having the formula:

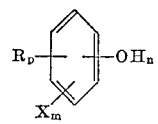

wherein X represents a halogen, R is a member selected from the group consisting of hydrogen and a hydrocarbon radical having from one to about twelve carbon atoms and $n$, $m$ and $p$, respectively, represent the number of hydroxy, halogen and R groups wherein $n$ is at least 1, $m$ is at least 1 and $p$ equals the number of positions on the ring minus $(m+n)$ and the combining the mixture from (1) with (2) a halide of a transition metal selected from the group consisting of Group IV($b$), Group V($b$) and Group VI($b$) metals wherein the ratio of aluminum-to-transition metal-to-halophenol, respectively, is from 1:1:0.5 to 4:1:6.

2. The process of claim 1 in which the reaction temperature is within the range of from 25 to 150° C.

3. The process of claim 2 wherein the olefin is propylene.

4. The process of claim 2 wherein the olefin is an ethylene-propylene mixture.

References Cited by the Examiner

UNITED STATES PATENTS

| | | | |
|---|---|---|---|
| 2,956,626 | 12/1960 | Pilar et al. | 260—94.9 |
| 3,150,122 | 9/1964 | Andersen et al. | 260—94.9 |

FOREIGN PATENTS

| | | |
|---|---|---|
| 851,112 | 10/1960 | Great Britain. |
| 867,766 | 5/1961 | Great Britain. |

JOSEPH L. SCHOFER, *Primary Examiner.*